United States Patent [19]

Garcia et al.

[11] Patent Number: 5,431,316

[45] Date of Patent: Jul. 11, 1995

[54] MULTI-PURPOSE SHOULDER BELT PAD

[76] Inventors: Bryan C. Garcia, 203 White Pine Dr.; Corrine Ruybal, 401 B Alamosa Ave., both of Alamosa, Colo. 81101

[21] Appl. No.: 201,896

[22] Filed: Feb. 25, 1994

Related U.S. Application Data

[63] Continuation-in-part of Ser. No. 151,405, Nov. 12, 1993, abandoned.

[51] Int. Cl.⁶ .................................................. A45F 5/00
[52] U.S. Cl. .................................... 224/151; 224/224; 224/264; 224/901
[58] Field of Search ............... 224/151, 224, 226, 227, 224/228, 229, 235, 236, 237, 264, 312, 901, 277, 219, 222; 280/801.1, 808; 297/482; 383/4, 22, 24; 150/113

[56] References Cited

U.S. PATENT DOCUMENTS

| | | | |
|---|---|---|---|
| 2,315,095 | 3/1943 | Rhodes | 224/228 |
| 4,535,878 | 8/1985 | Grahl | 383/4 |
| 4,545,414 | 10/1985 | Baum | 150/113 |
| 4,566,130 | 1/1986 | Coates | 383/4 |
| 4,678,205 | 7/1987 | Wold | 280/808 |
| 4,881,684 | 11/1989 | Chinman | 383/4 |
| 4,951,965 | 8/1990 | Brown | 280/801.1 |
| 4,958,759 | 9/1990 | Jarvis | 224/151 |
| 5,139,187 | 8/1992 | Fowler | 224/151 |
| 5,169,043 | 12/1992 | Catania | 224/224 |
| 5,170,917 | 12/1992 | Tourigny | 224/219 |
| 5,255,835 | 10/1993 | Burks | 224/151 |
| 5,318,084 | 7/1994 | Jackson | 224/151 |
| 5,337,933 | 8/1994 | Nunez | 224/224 |

FOREIGN PATENT DOCUMENTS 2835276 11/1979 Germany ...................... 224/151

OTHER PUBLICATIONS

J.A.M.A.; vol. 168, No. 7, p. 930 Date: Oct. 18, 1958.

Primary Examiner—Henry J. Recla
Assistant Examiner—Gregory Vidovich
Attorney, Agent, or Firm—Dean P. Edmundson

[57] ABSTRACT

A multi-purpose protective pad for use on a shoulder safety belt in a vehicle. The pad includes opposing flap portions which have mating fasteners thereon so that the pad can be extended around the shoulder belt and then the opposing flaps of the pad can be attached together. The pad protects the neck of a passenger from abrasion caused by the safety belt. The pad includes a built-in hidden waist belt for securing the pad around the waist of a user so that the pad can be used as a fanny pack. When the waist belt is left in place, the pad can be used as a wallet or personal organizer.

12 Claims, 2 Drawing Sheets

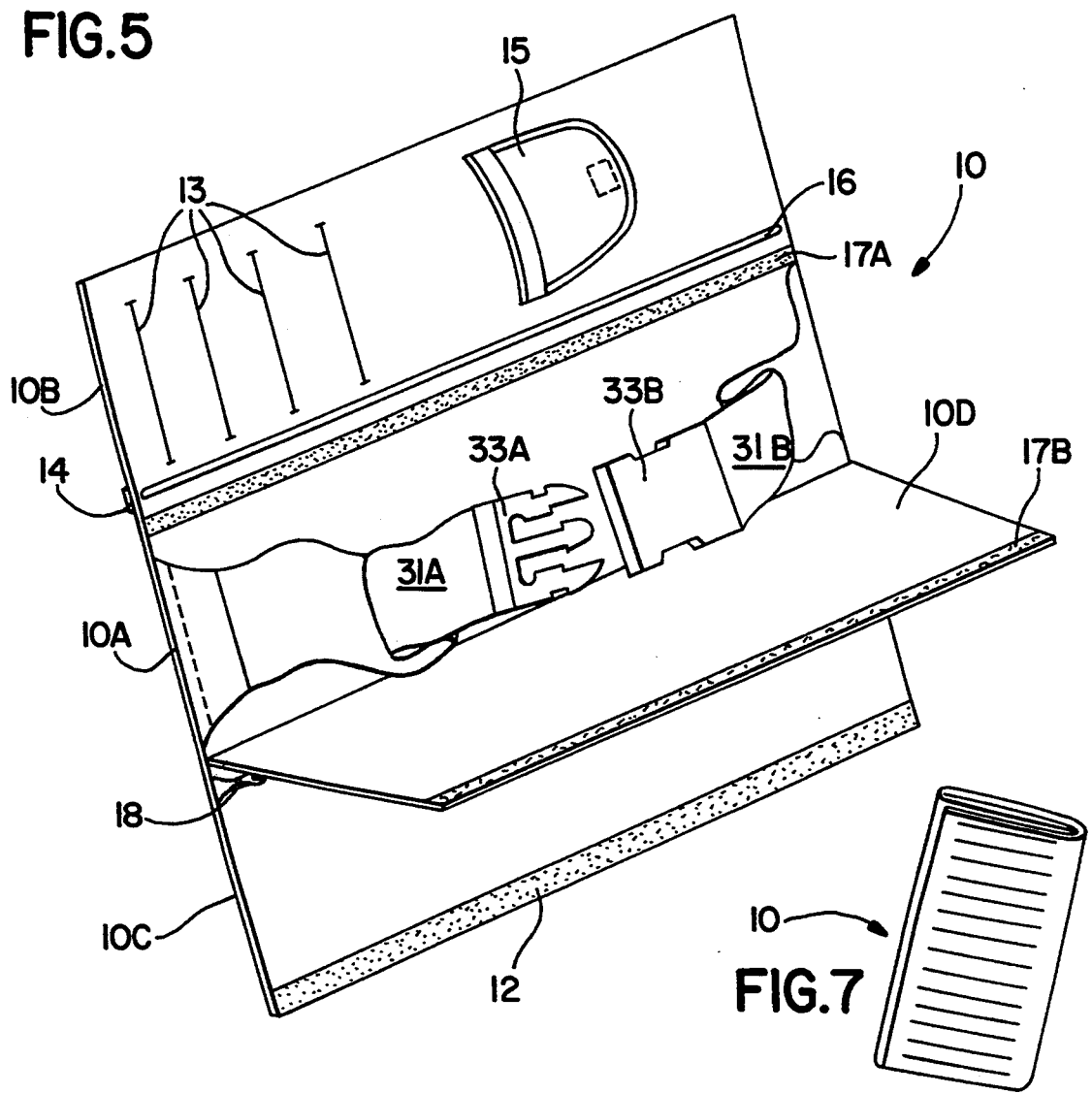
FIG.5
FIG.7
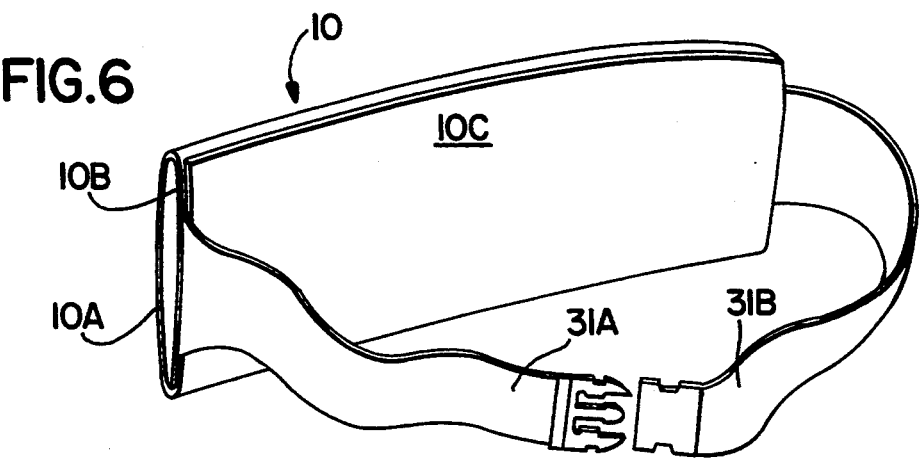
FIG.6

MULTI-PURPOSE SHOULDER BELT PAD

CROSS-REFERENCE TO RELATED APPLICATION

This is a continuation-in-part of my application Ser. No. 08/151,405, filed Nov. 12, 1993 abandoned.

FIELD OF THE INVENTION

This invention relates to shoulder safety belts used in vehicles to protect passengers. More particularly, this invention relates to a protective pad to be used in conjunction with a shoulder safety belt. Even more particularly, this invention relates to removable shoulder belt pads.

BACKGROUND OF THE INVENTION

All vehicles are now equipped with shoulder safety belts at the factory. These belts include a belt portion which extends from behind the passenger, over one shoulder, across the chest, and then is secured to a waist belt. The portion of the belt which extends over the shoulder and across the chest often contacts and rubs against the neck of the passenger. This is particularly a problem for passengers who are short. Although pads have been proposed to be placed on a shoulder belt, such pads have had limited utility.

There has not heretofore been provided a removable protective pad for use on shoulder safety belts which can also be removed and used as a wallet or fanny pack or as a personal organizer.

SUMMARY OF THE INVENTION

In accordance with the present invention there is provided a protective pad for attachment to a shoulder safety belt in a vehicle, which protective pad includes a built-in hidden waist belt. The pad includes opposing flap portions and mating fasteners carried by the side edges. The pad can be extended around the belt and then the opposing flaps can be detachably connected together to retain the pad on the belt. The protective pad may be configured as a bi-fold or a tri-fold pad which includes various compartments for storage of various personal items, e.g., driver's license, auto registration, insurance card, emissions card, credit cards, money, etc. Thus, it is also a personal organizer. It may also be used as a wallet (when the hidden waist belt is retained within the pad) or as a fanny pack (when the waist belt is exposed).

The pad is adjustably movable on the shoulder belt so that a passenger may move the pad to any desired position. Also, the pad can be easily removed from the belt for cleaning or for use on a different shoulder belt. The pad may be provided in any desired size and shape. The inclusion of a built-in hidden waist belt within the pad enables the device to be worn as a fanny pack or carried as a wallet when the belt is retained within the pad. Other advantages of the protective pad of the invention will be apparent from the following detailed description and the accompanying drawings.

BRIEF DESCRIPTION OF THE DRAWINGS

The invention is described in more detail hereinafter with reference to the accompanying drawings, wherein like reference characters refer to the same parts throughout the several views and in which:

FIG. 5 is a perspective view of the pad of FIG. 1 when in its opened position;

FIG. 6 is a perspective view of the pad of FIG. 1 with the waist belt in its deployed position where it is available for use in carrying the protective pad as a fanny pack; and FIG. 7 is a perspective of the pad used as a wallet.

DETAILED DESCRIPTION OF THE INVENTION

Figure 1:
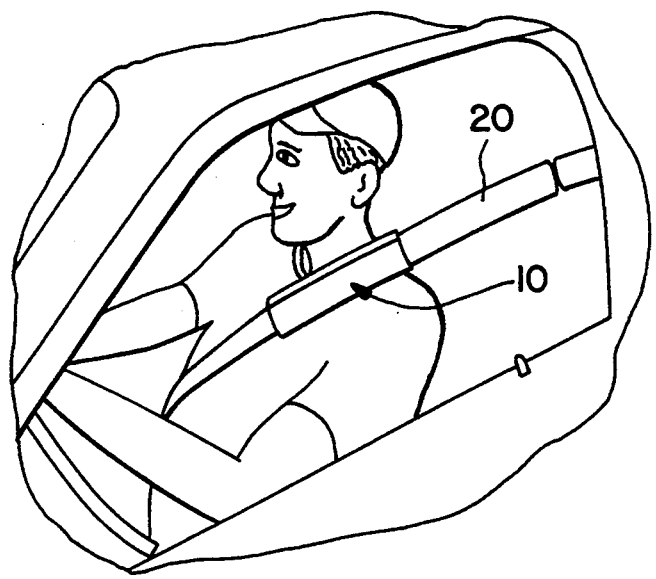
FIG. 1 is a perspective view illustrating use of the shoulder belt pad of the invention.
Figure 2:
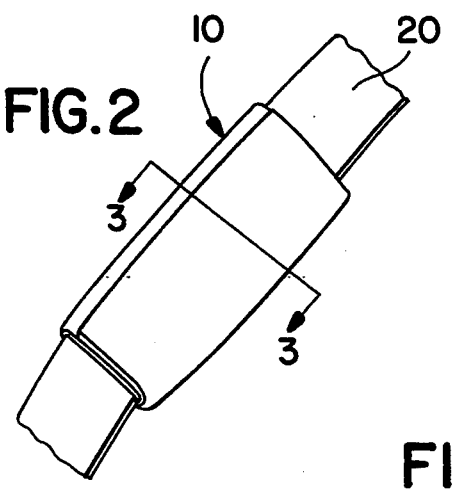
FIG. 2 is another perspective view of the protective pad of FIG. 1 attached to a shoulder belt.
Figure 3:
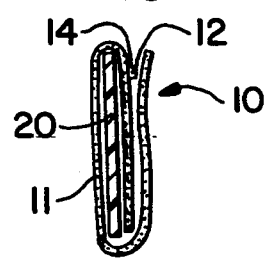
FIG. 3 is a cross-sectional view of the protective pad of FIG. 2 taken along line 3—3.

In FIGS. 1–3, 5 and 6 there is shown a protective pad 10 of the invention for use on a shoulder safety belt 20 in a vehicle. The pad includes opposing flap portions which can be detachably connected together. As shown in FIGS. 3 and 5, strips of mating fasteners 12 and 14 are carried by the opposing flaps of the pad. This arrangement enables the pad to be used on any shoulder belt, regardless of style. It also enables the protective pad to be placed on the shoulder belt at any desired position. The pad can also be moved longitudinally along the shoulder belt after the pad has been attached to the belt.

Figure 4:
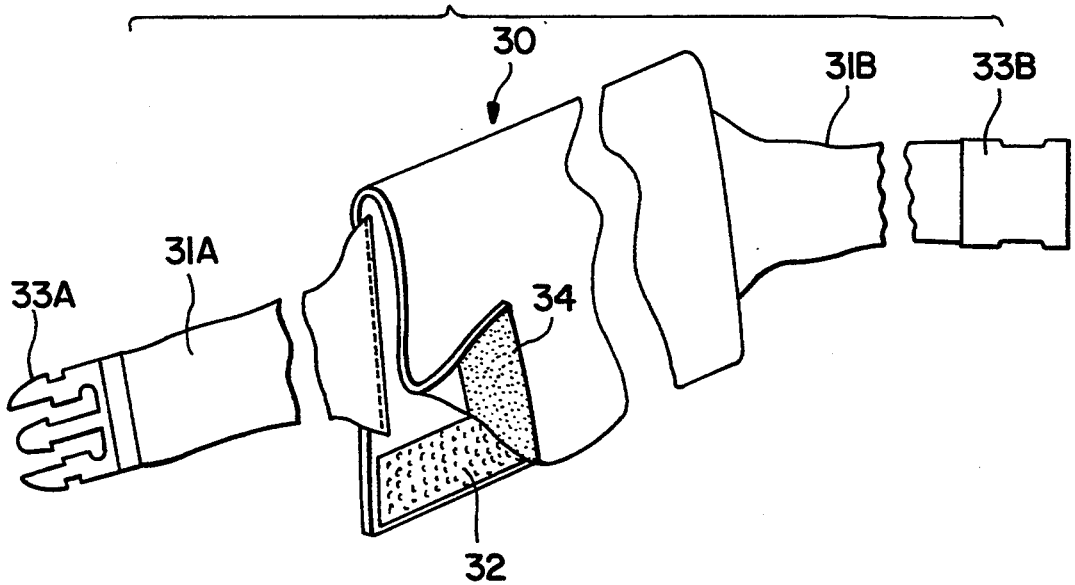
FIG. 4 is a perspective view of another embodiment of protective pad of the invention.

The protective pad may be provided in bi-fold or tri-fold form. Thus, FIG. 4 illustrates a bi-fold version of pad 30 comprising an integral pad which is folded over the shoulder belt. Opposing edges of the pad are detachably connected together by means of mating fastener strips 32 and 34.

FIG. 4 illustrates a built-in hidden waist belt secured to and extending outwardly from each end of a protective pad 30. Thus, one belt portion 31A is secured to one end of the pad and belt portion 31B is secured to the opposite end of the pad. Buckle portions 33A and 33B on the free ends of belt portions 31A and 31B are adapted to couple together to attach the protective pad to the waist of a user, whereby the device serves the function of a fanny pack in addition to being a protective pad for a shoulder belt. The belt portions 31A and 31B can be held within the pad 30 when the pad is being used as a protective pad on a shoulder safety belt in a vehicle.

FIGS. 5 and 6 show the tri-fold version of the protective pad 10. In this embodiment there is a central body portion 10A, an upper flap portion 10B, a lower flap portion 10C, and an interior flap portion 10D. Upper flap 10B includes a plurality of slot pockets or compartments 13 and a pocket or pouch which is closed by flap 15. There may also be one or more interior pockets 16.

The belt portions 31A and 31B are secured at one end to central portion 10A. A strip 17A of fastener material is secured along the length of central portion 10A near one edge thereof. A mating fastener strip 17B is secured along the edge of interior flap portion 10D such that flap portion 10D can be folded over the belt portions 31A and 31B and then held in place by virtue of fastener strip 17B connecting to strip 17A. This arrangement enables the built-in hidden waist belt portions to be safely secured within the device when the device is used as a protective shoulder belt pad.

Another pocket or compartment (or more than one) may be included in flap 10C. A zipper 18 may be used to close the compartment.

FIG. 6 is a perspective view of the protective pad 10 being used as a fanny pack, with built-in hidden waist belt portions 31A and 31B accessible for securing the device around the waist of a user. Thus, the device of the invention can be used as a protective pad for a shoulder belt in an automobile and can also be used as a fanny pack, by means of the built-in waist belt.

FIG. 7 shows the use of the pad as a wallet. Thus, the built-in belt portions are retained in a hidden manner within the pad.

The protective pad is preferably several inches in length. The opposing edges are preferably detachably connected by means of strips of hook and loop fasteners (e.g., Velcro brand fasteners) as illustrated in the drawings. However, other types of fastening means can also be used, e.g., snaps, buttons, magnets, adhesive, zipper, etc. which would enable opposing flaps of the pad to be detached from each other. Then the pad can be opened to enable the pad to be placed onto, or removed from, the shoulder belt. Preferably the pad snugly engages the shoulder belt but can still slide up or down the belt, as desired.

The width of the fastener strips used herein may vary. A width of about 1 inch is very adequate. The length of the pad may vary, e.g., from about 6 to 12 inches, with a length of about 9 inches being preferred. The fastener strips preferably extend along the full length of the pad.

The protective pad is light-weight and preferably is composed of a fabric outer layer and also preferably includes padding material 11 which may be conventional batting. The exterior of the pad preferably comprises soft fabric which is comfortable to the passenger when it contacts the neck area. It may be made with any desired thickness.

The pad is preferably washable and stain resistant. It may also be scented, if desired. It may also be reversible.

The shape of the pad may vary. For example, it may be rectangular, as shown in the drawings, or it may be square, round, oval, etc.

Various ornamental designs or decorations may be included on the pad. It may also be personalized with initials, pins, etc. Preferably, the pad is provided with one or more pockets for holding coins, keys, pens, or other personal items.

Other variants are possible without departing from the scope of the invention. For example, the protective pad may be used on other types of safety belts, infant seats, etc. The built-in hidden belt portions secured in the product are preferably elastic so that the product can be secured around the waist of a person of any size. Other variants are also possible.

What is claimed is:

1. An elongated protective pad for attachment to a shoulder safety belt in a vehicle; wherein said pad includes an interior and exterior sides and opposing flap portions connected thereto on opposing ends thereof and mating fasteners mounted to said flap portions wherein at least one of said flap portions includes an interior compartment; wherein said pad is adapted to extend around said shoulder belt, and said opposing flap portions adapted to be detachably connected together by said mating fasteners for retaining said pad on said belt such that said interior side faces said belt; wherein said pad further comprises connecting belt portions attached to said interior side of said pad for securing said pad around the waist of a user when said pad is detached from said safety belt; and further comprising an interior flap portion connected to said interior side for enclosing and retaining said connecting belt portions between said pad and said interior flap portion such that said belt portions are hidden when said pad is attached to said safety belt.

2. A protective pad in accordance with claim 1, wherein said mating fasteners comprise hook and loop fasteners.

3. A protective pad in accordance with claim 1, wherein said pad has a length greater than its width.

4. A protective pad in accordance with claim 2, wherein said hook and loop fasteners comprise separate strips which are mounted to said opposing flap portions.

5. A combination comprising a vehicle shoulder safety belt and a protective pad, wherein said pad includes an interior and exterior sides and opposing flap portions connected thereto on opposing ends thereof and mating fasteners mounted to said flap portions; wherein said pad is adapted to extend around said safety belt and said opposing flap portions of said pad are detachably connected together by said fasteners for retaining said pad on said belt such that said interior side faces said belt; wherein said pad further comprises a built-in hidden waist belt attached to said interior side of said pad for securing said pad around the waist of a user when said pad is detached from said safety belt; and further comprising an interior flap portion connected to said interior side of for enclosing and retaining said waist belt between said pad and said interior flap portion such that said waist belt is hidden when said pad is attached to said safety belt.

6. A combination in accordance with claim 5, wherein said fasteners comprise hook and loop fasteners.

7. A combination in accordance with claim 5, wherein said pad has a length greater than its width.

8. A combination in accordance with claim 6, wherein said hook and loop fasteners comprise separate strips which are secured to said opposing flap portions.

9. An elongated protective pad for attachment to a shoulder safety belt in a vehicle; wherein said pad comprises at least three opposing flap portions having interior and exterior sides and in connection thereof and mating fasteners mounted to at least two of said opposing flap portions; wherein at least one of said opposing flap portions includes an interior compartment; wherein said pad is adapted to extend around said shoulder belt, and said at least two opposing flap portions are adapted to be detachably connected together for retaining said pad on said shoulder belt such that said interior sides of said opposing flap portions faces said belt; wherein said pad further comprises connecting belt portions connected to one of said opposing flap portions on an interior side thereof for securing said pad around the waist of a user when said pad is detached from said safety belt; and said pad further comprising an interior flap portion connected to one of said opposing flap portions on an interior side thereof for enclosing and retaining said connecting belt portions between said one of said opposing flap portions having said interior flap portion mounted thereon and said interior flap portion such that said belt portions are hidden when said pad is attached to said safety belt.

10. A pad in accordance with claim 9, wherein at least two of said opposing flap portions includes interior compartments.

11. A pad in accordance with claim 9, wherein said fasteners comprise hook and loop fasteners.

12. A pad in accordance with claim 11, wherein said fasteners comprise separate strips which are secured to said at least two opposing flap portions.

* * * * *